United States Patent
Salazar

(10) Patent No.: US 9,371,633 B2
(45) Date of Patent: Jun. 21, 2016

(54) APPARATUS AND METHOD OF FREEZE PROTECTION IN FLUID SYSTEMS

(71) Applicant: Dennis R Salazar, Albuquerque, NM (US)

(72) Inventor: Dennis R Salazar, Albuquerque, NM (US)

(73) Assignee: Dennis R. Salazar, Albuquerque, NM (US)

( * ) Notice: Subject to any disclaimer, the term of this patent is extended or adjusted under 35 U.S.C. 154(b) by 4 days.

(21) Appl. No.: 14/553,287

(22) Filed: Nov. 25, 2014

(65) Prior Publication Data

US 2016/0145407 A1   May 26, 2016

(51) Int. Cl.
  *E03B 7/12*   (2006.01)
  *C08J 9/16*   (2006.01)
  *F16L 59/02*  (2006.01)

(52) U.S. Cl.
  CPC ... *E03B 7/12* (2013.01); *C08J 9/16* (2013.01); *F16L 59/021* (2013.01); *F16L 59/028* (2013.01); *C08J 2300/00* (2013.01)

(58) Field of Classification Search
  CPC .................. E03B 7/10; E03B 7/12
  USPC ............................ 138/27, 28, 32
  See application file for complete search history.

(56) References Cited

U.S. PATENT DOCUMENTS

| | | | |
|---|---|---|---|
| 318,856 A | 5/1885 | Bilz | |
| 596,062 A | 12/1897 | Firey | |
| 926,092 A | 6/1909 | Bright | |
| 2,029,630 A | 2/1936 | McMichael | |
| 2,599,325 A | 6/1952 | Fritzberg | |
| 4,651,781 A | 3/1987 | Kandleman | |
| 5,538,043 A | 7/1996 | Salazar | |
| 6,009,906 A | 1/2000 | Salazar | |
| 6,119,729 A * | 9/2000 | Oberholzer | E03B 7/10 138/27 |
| 6,180,686 B1 * | 1/2001 | Kurth | C08G 18/3206 521/109.1 |
| 6,338,364 B1 | 1/2002 | Mendenhall | |
| 7,402,029 B2 * | 7/2008 | Munch | F04B 17/00 138/32 |
| 2003/0130363 A1 * | 7/2003 | Meguriya | B29C 67/20 521/54 |

* cited by examiner

*Primary Examiner* — Patrick F Brinson

(57) ABSTRACT

A freeze protection material consisting of a closed-cell polymeric material that can be used to protect a variety of fluid systems from the damaging effects of thermal expansion of aqueous fluids container or transported therein. A method of protecting various fluid systems from freeze damage by applying a specialized freeze protection material therein.

9 Claims, 4 Drawing Sheets

APPARATUS AND METHOD OF FREEZE PROTECTION IN FLUID SYSTEMS

BACKGROUND OF THE INVENTION

1. Field of the Invention

The present invention generally relates to an apparatus and method for protecting fluid systems against damage from the expansion of freezing aqueous solutions contained or transported within said fluid systems. The invention also describes the specific properties of said apparatus that help to ensure its effectiveness.

2. Description of the Prior Art

When water freezes within a confined space, it is well known that the 9% coefficient of thermal expansion occurring during the phase shift of water between liquid and solid results in extreme pressures being exerted upon apparatuses and assemblies of fluid systems, particularly those containing or transporting aqueous fluids or solutions.

In U.S. Pat. No. 318,856, to Bilz, it was proposed that a series of cork rings be sequentially inserted within a pipe to form a liner, allowing for the expansion of freezing water within the pipe. This art fails to account for the fact that cork is a natural material that degrades and decomposes rather quickly, the process of which poses the threat of fragmentation of the material and clogging of the pipe over time. This prior art also fails to disclose a means of protecting anything other than a pipe, such as a vessel, plenum, manifold or container.

In U.S. Pat. No. 596,062, to Firey, it is proposed that a core of either rubber or metal be disposed within a pipe to prevent rupture caused by freezing water within the pipe. This art is deficient in that a metal core would elastically deform under the pressure of a single freeze and wouldn't be able to return to its original shape or dimensions, thereby failing to repeatedly protect the pipe during subsequent freezes. Additionally, Firey discloses either a hollow rubber core or a solid rubber core to be placed within the pipe to offer protection to the pipe from freezing. The rubber cores mentioned by Firey are not described as to their properties, as it is now known by those skilled in the art that solid rubber will not compress in the manner necessary to perform the intended function. A hollow rubber core is essentially a tube, and is rendered useless if a shard of ice penetrates the tube and allows water to enter into the hollow space within. In addition, the hollow tube will fill with water unless the ends are somehow sealed either during installation or during manufacture. If the ends are sealed during manufacture, then the hollow core must be made to predetermined lengths, making it difficult to use in a wide variety of applications. These embodiments also fail to describe a means of protecting anything other than a pipe, such as a vessel, plenum or container of any sort.

In U.S. Pat. No. 926,092, to Bright, it was disclosed that a core of metallic material is surrounded by a resilient covering, and is then inserted into a length of pipe in order to protect the pipe from the damaging effects of freezing water contained in the pipe. Bright claims that the coefficient of elasticity of the resilient material will offer protection to the pipe under the expansive pressures of the freezing water contained therein. However, it is well known by those skilled in the art that solid rubber, although elastic, will not compress but will instead deflect, and will occupy the same volume of space, resulting in a failure of the pipe or a fitting. Bright also fails to disclose any of the properties of the resilient covering, which is key to its performance. Bright also fails to describe a means of protecting anything other than a pipe, such as a vessel, plenum or manifold or container.

In U.S. Pat. No. 4,651,781, to Kandleman, it was proposed that an inner tube is supported in a closed-cell, plastic foam shell, both being supported in a tubing member serving as containment piping. This art is designed for use as an accumulator in a hydraulic system for attenuating pressure surges and doesn't describe a method of freeze protection.

In U.S. Pat. Nos. 5,538,043 and 6,009,906 to Salazar, it was proposed that a flexible, resilient, compressible trunk be employed within a pipeline in order to absorb the expansion pressure of fluid within said pipeline. However this prior art fails to adequately describe the properties of the material that is to be placed within the pipeline. Not every resilient, flexible, compressible material will adequately perform the intended task. There are specific characteristics of the material that will determine its effectiveness, such as the closed-cell configuration of the foam. Even closed-cells outside of a specific size range tend to absorb water under the extreme pressures exerted on the material during freeze conditions. Is also known to those skilled in the art that the hardness of the material must be within a specific range and experiments have revealed that there is a high likelihood of failure if the properties of the material do not meet strict criteria. Additionally, this prior art discloses that the material will not impart impurities into the transported fluid. However, through leachability testing it is known by those skilled in the art that most polymers will leach particulates of their compositional makeup into the surrounding fluid, particularly at high temperatures. This can pose a problem in systems that are sensitive to impurities or such as potable water systems or sensitive fluid systems found in scientific and industrial equipment. Furthermore, this prior art is limited in its application. The prior art specifies the use of the material in pipelines, tubes and conduits, yet there is no mention of a method or apparatus for protecting other types of vessels or containers.

The disadvantages inherent to these apparatuses and methods limit their viability by either being incomplete in their explanation of how to make and use or are unreliable and ineffective. Existing freeze protection methods and apparatuses are deficient in providing a means of reliably and repeatedly protecting fluid systems from damage to components during a freeze of the system.

SUMMARY OF THE INVENTION

The present invention is an apparatus and method of protecting fluid systems from freeze. The apparatus of the invention is a closed-cell, expanded polymeric material. The method of the invention is to install the above material within a variety of fluid systems to offer freeze protection. By occupying a volume of space within a fluid system or vessel, and by having certain specific properties, this material is able to reliably and repeatedly prevent freeze damage within said systems.

It is a primary object of the present invention to provide an apparatus, in the form of a closed-cell, expanded polymeric material, intended to be used to reliably and repeatedly protect various fluid systems from damage caused by freeze.

It is another object of the present invention to describe the specific properties of the closed-cell, expanded polymeric material, which can be configured in a variety of ways in order to protect many types of fluid systems.

It is a further object of the present invention to disclose a method for protecting various fluid systems by means of installing the aforementioned apparatus within the system and securing it in place.

These and other objects of the present invention will become apparent to those skilled in the art upon reading the accompanying description, drawings, and claims set forth herein. The headings provided are for the convenience of the reader only. No headings should be construed to limit the content in any way.

BRIEF DESCRIPTION OF THE DRAWINGS

The benefits of the present invention are evident from the subsequent description, the included claims, and the attached drawings wherein:

DETAILED DESCRIPTION OF THE INVENTION

1. Definitions

Figure 1A:
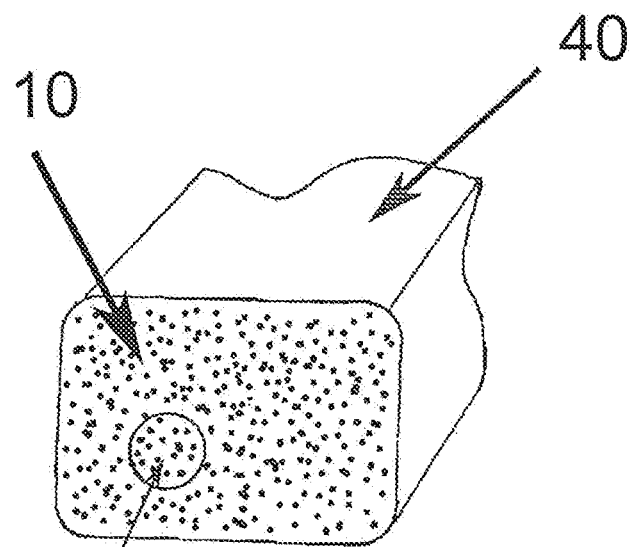
FIG. 1A is a cross-sectional view of the closed-cell, expanded polymeric material of the present invention.
Figure 1B:
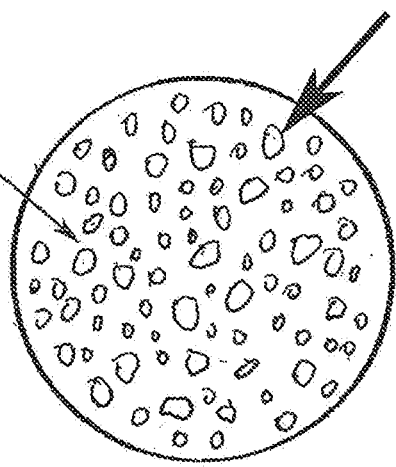
FIG. 1B is a magnified view of the cellular structure of the present invention.
Figure 2A:
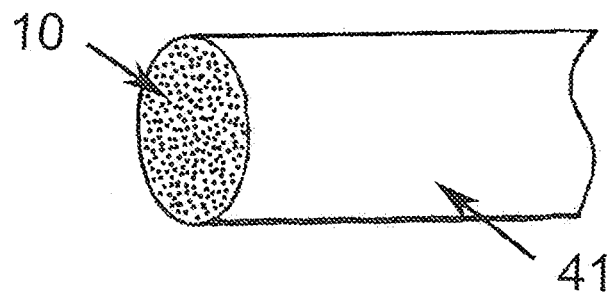
FIG. 2A is an example of one embodiment of the present invention, extruded in a round profile.
Figure 2B:
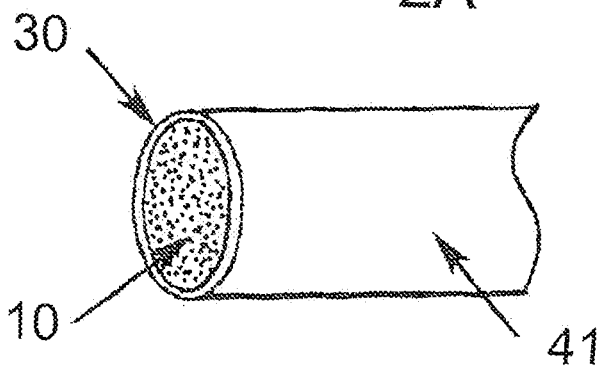
FIG. 2B is an example of an embodiment of the present invention, extruded in a round profile, with an outer skin.
Figure 2C:
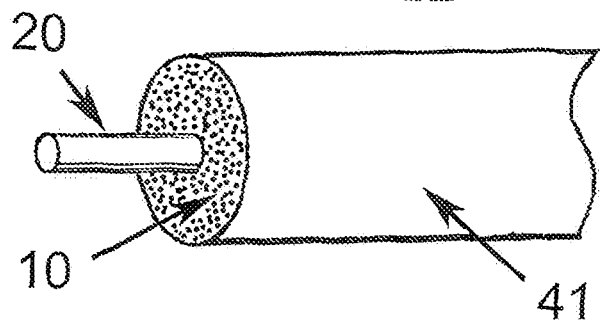
FIG. 2C is an example of an embodiment of the present invention, extruded in a round profile, with an interior twine.
Figure 2D:
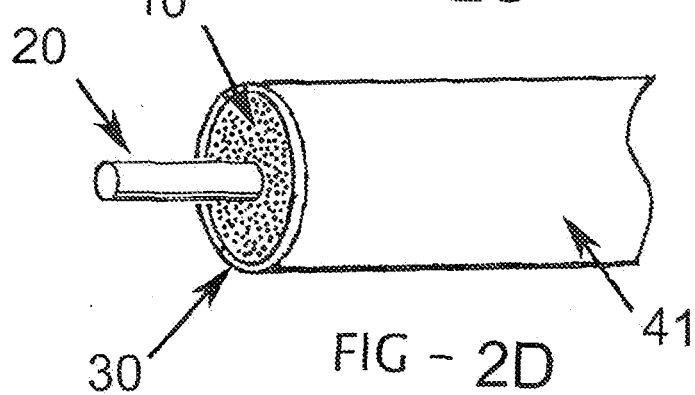
FIG. 2D is an example of an embodiment of the present invention, extruded in a round profile, with an interior twine, and an outer skin.

Fluid systems as used herein shall mean any conduit, pipe, tube, vessel, container, valve, manifold or any other form capable of containing or transporting an aqueous fluid.

Sensitive fluid systems as used herein shall mean any fluid system in which the presence of impurities in the fluid can potentially inhibit, attenuate, or otherwise disturb the chemical reactions occurring in the system, such as those found in scientific and industrial equipment.

Chemical reactions as used herein shall mean any catalytic, electrolytic, or similar chemical process that occurs in the presence of the liquid being transported or contained in the fluid systems.

2. Best Mode of the Invention

The best mode of the present invention as contemplated by the inventor, as is seen in the drawings, provides a closed-cell, expanded polymeric material that can be manufactured in a variety of forms, from an extruded profile of any shape to molded forms of any shape, in order to be inserted into various fluid systems so as to protect said systems and their components from damage due to freeze. The present invention can be used to protect potable fluid systems, non-potable fluid systems, and sensitive fluid systems where element-specific sensitivities exist due to chemical reactions occurring within the fluid system.

3. How to Make the Invention

It is well known to those skilled in this art that there are many methods and apparatuses intended to delay or prevent damage to fluid systems that are exposed to freezing temperatures. The present invention discloses the specific properties of the closed-cell, expanded polymeric material that help to ensure its effectiveness as a freeze protection material.

The present invention is a closed-cell, expanded polymeric material (40), which can be made of a variety of polymers, depending on the intended application. In all embodiments, the material contains tiny gas bubbles (10) throughout its polymeric structure, wherein the gas bubbles (10) are isolated individually in closed cells (11) ranging in size from 0.15 mm to 0.30 mm in diameter. The cells (11) are separated from one another in order to prevent the surrounding fluid from being absorbed into the material. This closed-cell structure is accomplished through the use of an acceptable blowing agent, introduced into the polymer as the material is cured and formed by extrusion or by molding.

The present invention, in all embodiments, has a compression set less than 10%. In order to repeatedly perform the function for which the material is intended, it must return almost completely to its original shape and dimensions after compression. The compression set is a function of the base polymer composition, the curing agent's properties, the filler material used to provide rigidity, and the aforementioned cell structure.

The present invention, in all embodiments, shall have a hardness value between 25-40 Shore A Durometer. It is now known by those skilled in the art that expanded polymeric materials with hardness outside the above specified range will either compress too much or too little to perform the intended function.

The present invention, in all embodiments, will be made into any shape which will occupy a volume of space within the fluid system, such that the shape and dimensions of the material afford it the ability to buffer against the 9% coefficient of thermal expansion related to the freezing of aqueous fluids or solutions contained or transported within the fluid system.

Figure 3:
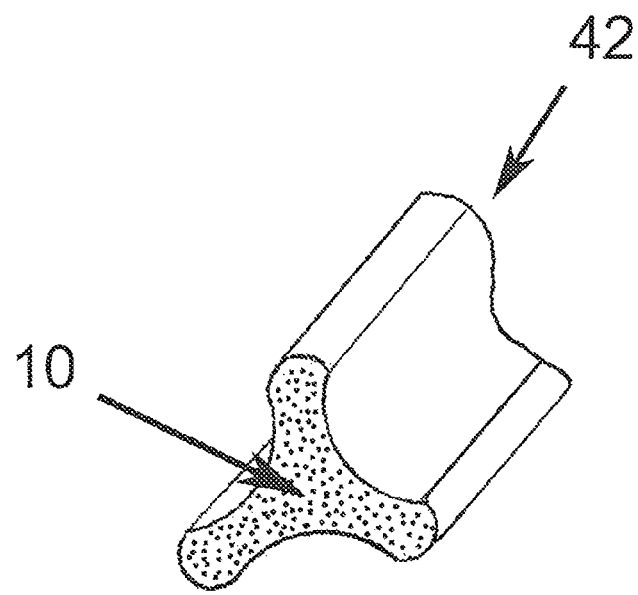
FIG. 3 is an example of an embodiment of the present invention, extruded in a custom clover-shaped profile.
Figure 4:
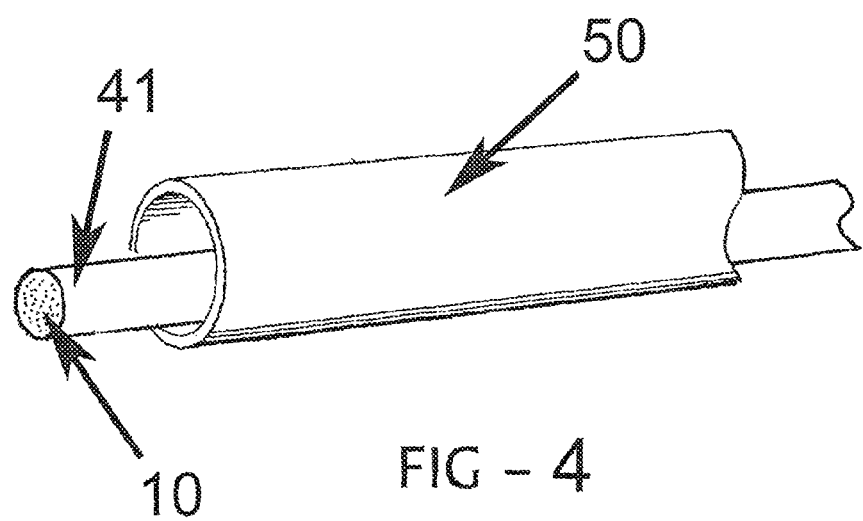
FIG. 4 is an example of an embodiment of the present invention, extruded into a cord with a round profile, having been inserted into a conduit or pipe.

In a preferred embodiment, the present invention is made into lengths of cord (41) by means of extrusion. The cord (41) can be a round profile, as shown in FIGS. 2a, 2b, 2c, 2d & 4, or any other profile, such as the clover profiled cord (42) shown in FIG. 3. The invention may also have disposed throughout its length a filament (20) of flexible material to prevent stretching of the cord (41) during manufacture or installation. This filament (20) is introduced within the cord (41) during manufacture via crosshead extrusion.

The invention can be extruded or molded into virtually any shape, wherein the material occupies a volume of space within the fluid system, such that the shape and dimensions of the material afford it the ability to buffer against the 9% coefficient of thermal expansion related to the freezing of aqueous fluids or solutions contained or transported within the fluid system.

4. How to Use the Invention

The great many problems solved by the present invention can be easily seen by those skilled in this art. There are a wide variety of fluid systems that contain or transport aqueous fluids and/or solutions in areas that are exposed to freezing temperatures. The present invention can be made into a variety of forms, such that its size and dimensions afford it the ability to occupy a volume of space within a fluid system sufficient to buffer against the 9% coefficient of thermal expansion related to the freezing of the fluid. An example of such a fluid system is that of a residential potable water system, wherein pipes (50) distribute potable water to locations throughout the residence. In a preferred embodiment, the freeze protection material is made into a round cord (41), either with or without a flexible filament (20) disposed throughout its length. The cord (41) is then inserted into the interior of the fluid system in locations that are exposed to freezing temperatures. When water inside the fluid system freezes, the cord (41) will compress to occupy a smaller volume of space, allowing the forming ice to expand into the space formerly occupied by the cord (41). Upon thawing, the cord (41) returns almost completely to its original dimensions, and remains within the fluid system to offer protection from subsequent freezes.

Another example of fluid systems that may require freeze protection are the sensitive fluid systems found in scientific or industrial equipment. A variety of scientific or industrial equipment employs the use of liquid cooling means, such as those found in the petrochemical industry. Often the equipment utilizes pipes that transport liquid, usually water or coolant, over components that generate heat during normal operation. There exists a risk of freeze when the equipment is non-operational. In an embodiment of the present invention intended for this purpose, the composition of the material is selected to avoid contamination by elements that are known by those skilled in the art to negatively affect the chemical reactions that occur in the presence of the fluid being used as coolant, while maintaining all of the crucial characteristics related to cell size, compression set, and hardness. Many elements which are commonly present in a variety of polymers, fillers, curing agents, or blowing agents, such as Zinc (Zn), Silicon (Si), Sulfur (S), Sodium (Na), Potassium (K), and halogens (At, Br, Cl, F & I), are known to be incompatible with the chemical reactions that occur within these sensitive fluid systems, such as those used to crack hydrocarbons in the petrochemical industry.

Figure 5:
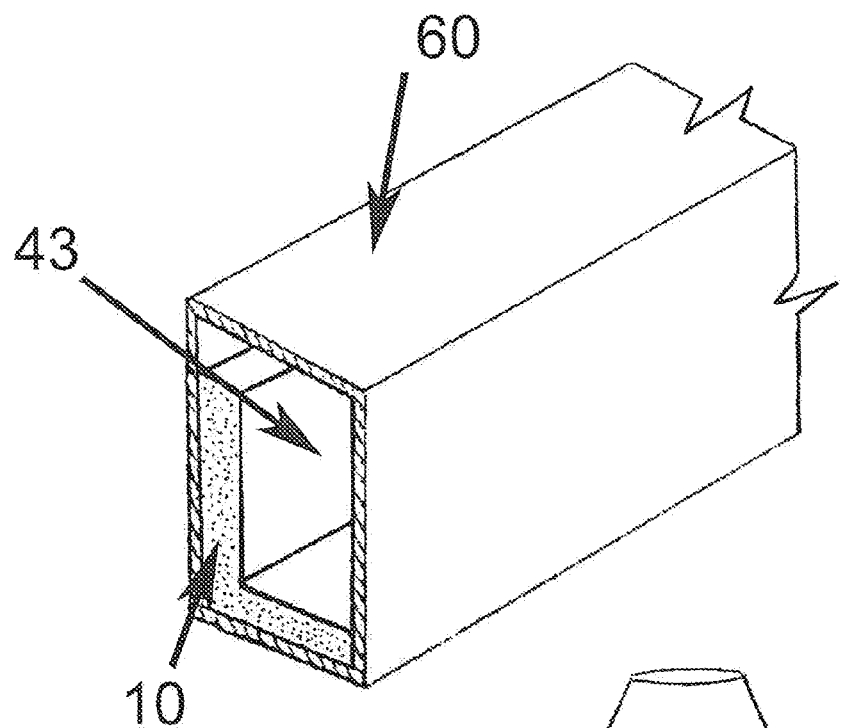
FIG. 5 is an example of an embodiment of the present invention, molded into a box shape for use in manifolds, plenums or other non-tubular fluid systems.

In another embodiment, the freeze protection material of the present invention can be molded into forms that can be inserted into fluid systems that are non-tubular in shape. FIG. 5 shows a plenum (60) in which the freeze protection material has been made into a box-shaped configuration (43).

Figure 6:
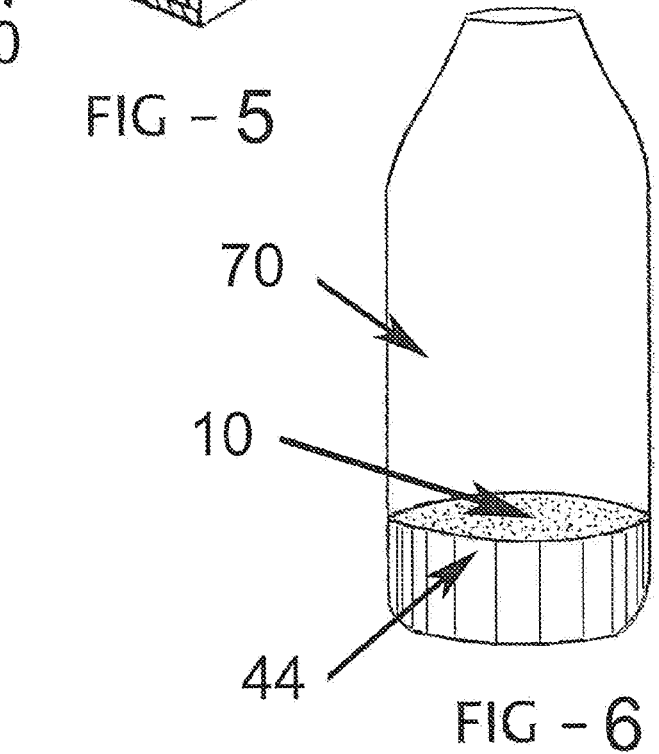
FIG. 6 is yet another embodiment of the present invention, molded into a wafer-like shape for use in vessels, containers, accumulators or other fluid systems with a cylindrical shape.

In yet another embodiment, the freeze protection material of the present invention can be molded into forms that can be inserted into fluid systems that are cylindrical in shape. FIG. 6 shows a bottle shaped component (70) in a fluid system, in which the freeze protection material has been formed into a wafer-shaped configuration (44).

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A freeze protection material for potable fluid systems comprising:
    a closed-cell expanded polymeric material with cell sizes ranging from 0.15 mm-0.30 mm,
    a compression set less than 10%,
    a hardness between the range of 25-40 Durometer Shore A, wherein said material is inserted into potable fluid conduits and/or systems to protect them from damage due to freeze conditions.

2. A freeze protection material for potable fluid systems according to claim 1 wherein the material is an extruded profile of any shape that occupies a volume of space within the fluid system or vessel, such that its shape and dimensions provide the ability to buffer against the 9% coefficient of thermal expansion related to the freezing of aqueous fluid within the system.

3. A freeze protection material for potable fluid systems according to claim 1 wherein the material is formed of a non-toxic polymer composition intended for potable water systems.

4. A freeze protection material for non-potable fluid systems comprising:
    a closed-cell expanded polymeric material with cell sizes ranging from 0.15 mm-0.30 mm,
    a compression set less than 10%,
    a hardness between the range of 25-40 Durometer Shore A, wherein said material is inserted into non-potable fluid conduits and/or systems to protect them from damage due to freeze conditions.

5. The freeze protection material for non-potable fluid systems according to claim 4 wherein the material is an extruded profile of any shape that occupies a volume of space within the fluid system or vessel, such that its shape and dimensions provide the ability to buffer against the 9% coefficient of thermal expansion related to the freezing of aqueous fluid within the system.

6. A freeze protection material for non-potable fluid systems according to claim 4 wherein the material is a polymer composition free of Zinc (Zn), Silicon (Si), Sulfur (S), Sodium (Na), Potassium (K), or halogens, so as not to interfere with chemical reactions in sensitive fluid systems, through the leaching of these elements into the surrounding fluids.

7. A freeze protection material for fluid systems comprising:
    a closed-cell expanded polymeric material with cell sizes ranging from 0.15 mm-0.30 mm;
    a compression set less than 10%;
    a hardness between the range of 25-40 Durometer Shore A, wherein said material is inserted into fluid vessels and/or systems to protect them from damage due to freeze conditions.

8. The freeze protection material for aqueous fluid systems according to claim 7 wherein the material is of any molded shape that occupies a volume of space within the fluid system or vessel, such that its shape and dimensions provide the ability to buffer against the 9% coefficient of thermal expansion related to the freezing of aqueous fluid within the system.

9. A method for freeze protection of fluid systems comprising the steps of:
    (a) providing a freeze protection material comprising;
    a closed-cell expanded polymeric material with cell sizes ranging from 0.15-0.30 mm, a compression set less than 10%, and a hardness between the range of 25-40 Shore A Durometer, wherein the material is an extruded or molded profile of any shape or dimension that occupies a volume of space within the fluid systems, such that its shape and dimensions provide the ability to buffer against the 9% coefficient of thermal expansion related to the freezing of aqueous fluid within the system; and
    (b) inserting the material into the fluid system; and
    (c) securing the material within the system.

* * * * *